No. 736,562. PATENTED AUG. 18, 1903.
C. T. STARR.
SPOOL HOLDER.
APPLICATION FILED MAR. 26, 1903.

NO MODEL.

WITNESSES
Emmons R. Newell
Thomas F. Hastings

INVENTOR
Carrie T. Starr,
BY
H. L. Reynolds
ATTORNEY

THE NORRIS PETERS CO., PHOTO-LITHO., WASHINGTON, D. C.

No. 736,562. Patented August 18, 1903.

UNITED STATES PATENT OFFICE.

CARRIE T. STARR, OF WILBUR, WASHINGTON.

SPOOL-HOLDER.

SPECIFICATION forming part of Letters Patent No. 736,562, dated August 18, 1903.

Application filed March 26, 1903. Serial No. 149,722. (No model.)

*To all whom it may concern:*

Be it known that I, CARRIE T. STARR, a citizen of the United States, and a resident of Wilbur, in the county of Lincoln and State of Washington, have invented certain new and useful Improvements in Spool-Holders, of which the following is a specification.

My invention relates to an improvement in spool-holders and will be defined in scope by the claims.

The accompanying drawings show my invention in a form now preferred by me.

Figure 2:
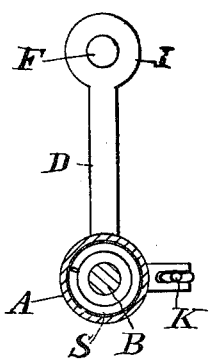
Figure 1:
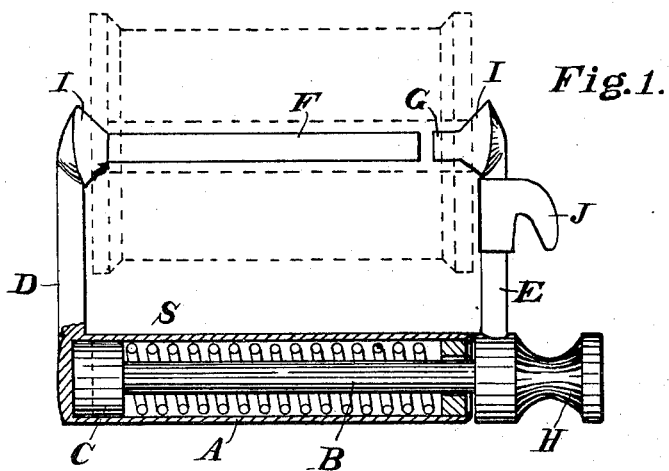
Figure 3:
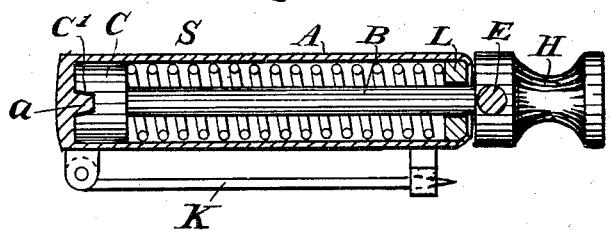

Figure 1 is an elevation and partial section through my device. Fig. 2 is a cross-section thereof, and Fig. 3 is a longitudinal section taken in a plane substantially at right angles to that of Fig. 1.

My device includes two arms which are adapted to support a spool between them, one of said arms being movable away from the other, or in the general direction of the spool-axis, and also being capable of swinging to one side so as to clear the spool. It is also provided with means for drawing said arms toward each other to retain the spool between them and means for holding them in line. While these may be of numerous forms, I have herein shown only one form, the same being the one now preferred by me. I will now describe this form.

The spool is held between two arms E and D, said arms being preferably provided with extensions F and G, adapted to enter the bore of the spool, the extension G being short, so that it may be withdrawn and the arm E be swung to one side to clear the spool without requiring a very considerable movement longitudinally of the spool. I prefer that these arms shall have conical bearings I for the spool ends, although this is not essential. The arm D, which I call the "fixed" arm, is secured to or formed as a part of a barrel or cylinder A, and the arm E is secured to or formed as a part of a plunger, which fits within said barrel, the plunger consisting of an outer head H, a stem B, and an inner head C. The plunger and barrel are provided with means for securing correct registry of the arm extensions F and G, which form the journal for the spool when the arms are drawn together. As herein shown this consists of a notch C' and an engaging tongue or pin $a$, one upon the head C of the plunger and the other carried by the barrel. Within the barrel is a helically-coiled compression-spring S, which surrounds the stem B of the plunger. The thrust of the spring is against the head C at one end and at the other end against a member carried by the barrel. This member, as herein shown, is a ring or washer L, which is secured within the open end of the barrel. The barrel is provided with a pin K, by which it may be secured to the clothing of the user or to any other fabric. When so secured, the spool will hang slightly downward. By my device the spool may be supported from the clothing, where it is at all times quickly and readily accessible. Its use obviates the necessity of the delay so frequently caused by looking for the spool of thread. Its use will thus save considerable time, which may be profitably employed otherwise.

Having thus described my invention, what I claim, and desire to secure by Letters Patent, is—

1. A spool-holder comprising a tube or barrel, an arm extending from one end thereof and carrying a pin adapted to enter the bore at one end of a spool, a plunger and rod within said tube or barrel, a spring about the rod and within said barrel acting to hold the plunger and rod within the barrel, and an arm carried by the projecting end of said rod and adapted to engage the other end of the spool.

2. A spool-holder comprising a tube or barrel, an arm extending from one end thereof, a pin carried by the outer end of said arm substantially parallel with the barrel and adapted to enter the bore of the spool, a plunger within the barrel, said barrel and plunger having engaging members preventing relative rotation when the plunger is down, a spring within the barrel acting to hold the plunger down, and an arm connected with the said plunger and extending without the barrel to engage the spool to hold it in place upon its pin.

In testimony whereof I have hereunto affixed my signature, this 16th day of March, 1903, in the presence of two witnesses.

CARRIE T. STARR.

Witnesses:
F. H. LIEBEN,
G. THOMPSON.